(12) United States Patent
Miyanabe et al.

(10) Patent No.: US 6,243,337 B1
(45) Date of Patent: Jun. 5, 2001

(54) TILT DETECTOR

(75) Inventors: Shogo Miyanabe; Hiroki Kuribayashi, both of Tsurugashima (JP)

(73) Assignee: Pioneer Electronic Corporaion, Tokyo (JP)

( * ) Notice: Subject to any disclaimer, the term of this patent is extended or adjusted under 35 U.S.C. 154(b) by 0 days.

(21) Appl. No.: 09/268,831

(22) Filed: Mar. 16, 1999

(30) Foreign Application Priority Data

Mar. 18, 1998 (JP) .................................................. 10-068968

(51) Int. Cl.$^7$ ....................................................... G11B 7/00
(52) U.S. Cl. ............................................ 369/44.32; 369/54
(58) Field of Search ........................... 369/44.32, 44.28, 369/44.27, 54, 58, 47, 112

(56) References Cited

U.S. PATENT DOCUMENTS 5,253,239 * 10/1993 Edahiro et al. .................... 369/44.28
5,848,045 * 12/1998 Kirino et al. ........................ 369/54 X

* cited by examiner

*Primary Examiner*—Muhammad Edun
(74) *Attorney, Agent, or Firm*—Perman & Green, LLP

(57) ABSTRACT

A tilt detector for detecting a tilt which is present between a recording disk and a pickup. The tilt detector detects an error value between a read signal read from a central recording track within three recording tracks adjacent to each other and a predetermined value. A first coefficient is calculated from a correlation of a read signal read from the recording track adjacent to the central recording track on the inner peripheral side of the disk with the error value, and a second coefficient is calculated from a correlation of a read signal read from the recording track adjacent to the central recording track on the outer peripheral side of the disk with the error value. A tilt present between the recording disk and the pickup is detected on the basis of a relationship in magnitude between the first and second coefficients.

5 Claims, 8 Drawing Sheets

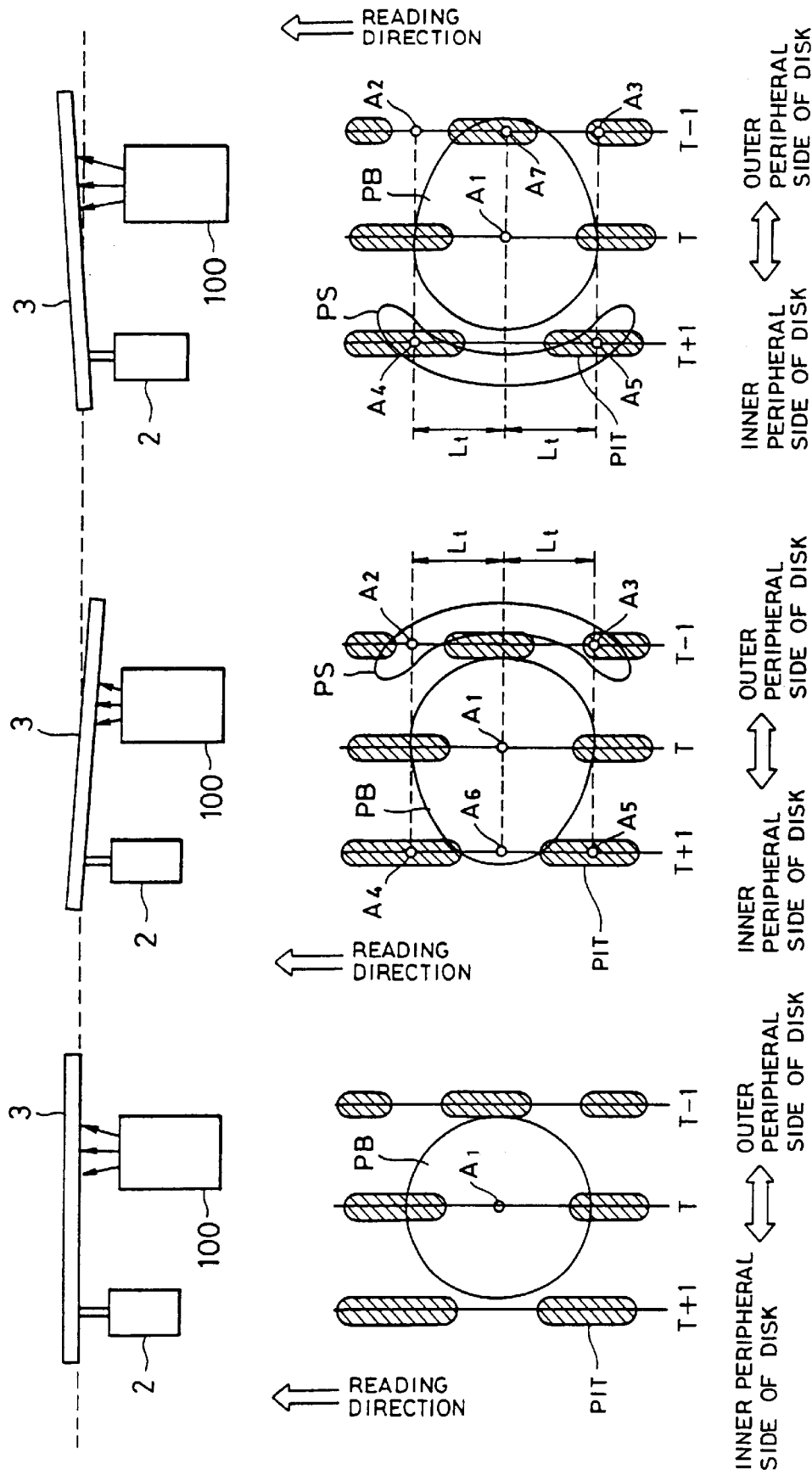

TILT DETECTOR

BACKGROUND OF THE INVENTION

1. Field of the Invention

The present invention relates to a tilt detector for detecting a tilt which is present between an information reading means for reading recorded information from a recording disk as a recording medium and the recording disk.

2. Description of Related Background Art

For correctly reading recorded information from a recording disk as an optical recording medium, it is necessary to irradiate the recording disk with a reading beam perpendicularly to a recording surface thereof. However, if the recording disk itself warps, the recording disk cannot be irradiated with the reading beam perpendicularly to the recording surface thereof, thereby resulting in a reduction in information reading accuracy.

To avoid this inconvenience, a recorded information reproducing apparatus for reproducing recorded information from such a recording disk is provided with a tilt sensor for detecting a tilt formed between a pickup as an information reading means and the recording disk. The entire pickup is tilted by an angle corresponding to a tilt detected by the tile sensor, or desired signal processing is applied to a read signal read by the pickup in accordance with the detected tilt, thereby preventing information reading accuracy from reducing.

FIG. 1 is a diagram schematically illustrating the configuration of a recorded information reproducing apparatus which is equipped with a tilt sensor 4 for detecting a tilt between a recording disk and a pickup, as mentioned above.

Referring specifically to FIG. 1, a beam generator 41 in the tilt sensor 4 emits divergent light which is irradiated to two different positions on a recording surface of a recording disk 3 rotated or driven by a spindle motor 2. A light detector 42 receives a portion of reflected light produced when the divergent light is irradiated to the recording surface of the recording disk 3, and supplies a subtractor 44 with a first detecting signal having a level corresponding to the amount of received light. A light detector 43, in turn, is disposed at a position which is symmetrical to the light detector 42 with respect to the beam generator 41. The light detector 43 receives a portion of the reflected light produced when the divergent light is irradiated to the recording surface of the recording disk 3, and supplies the subtractor 44 with a second detecting signal having a level corresponding to the amount of received light. The subtractor 44 calculates the difference in level between the first detecting signal and the second detecting signal, and outputs the difference as a tilt error signal. The apparatus is herein on the assumption that the beam generator 41 and the light detectors 42, 43 are disposed on the same parallel surface as a pickup, not shown.

When the recording surface of the recording disk 3 and the pickup is maintained in a parallel relationship, the light detectors 42, 43 receive the same amount of reflected light, causing the subtractor 44 to generate the tilt error signal at "0." On the other hand, if the recording disk 3 is not flat for warp or the like, the light detectors 42, 43 receive different amounts of received light from each other, causing the subtractor 44 to output the tilt error signal corresponding to the difference in the amount of reflected light.

However, if the tilt sensor 4 is equipped in a recorded information reproducing apparatus, there is a problem that the scale of the apparatus becomes larger. Further, there is another problem that high positioning accuracy is required to correctly locate the tilt sensor 4 at a position for maintaining a parallel relationship with the pickup when the tilt sensor 4 is mounted.

SUMMARY OF THE INVENTION

In view of the problems mentioned above, it is an object of the present invention to provide a tilt detector which is capable of accurately detecting a tilt which is present between a recording disk and a pickup in a small scaled configuration.

A tilt detector according to the present invention is adapted to detect a tilt present between information reading means and a recording disk, wherein the information reading means reads recorded information from the recording disk having recording tracks formed thereon. The tilt detector comprises error detecting means for detecting an error value between a read signal read from a central recording track within three recording tracks which are adjacent to each other and a predetermined value, a coefficient calculating means for calculating a first coefficient from a correlation of a first read signal read from a first adjacent recording track which is adjacent to the central recording track on an inner peripheral side of the disk with the error value, and for calculating a second coefficient from a correlation of a second read signal read from a second adjacent recording track which is adjacent to the central recording track on an outer peripheral side of the disk with the error value, and means for calculating a tilt present between the recording disk and the information reading means based on a relationship in magnitude between the first coefficient and the second coefficient.

BRIEF DESCRIPTION OF THE DRAWINGS

FIGS. 6A–6C are diagrams for explaining a positional relationship between a beam spot and a central recording track and adjacent recording tracks;

DETAILED DESCRIPTION OF THE PREFERRED EMBODIMENT

An embodiment of the present invention will hereinafter be described with reference to the accompanying drawings.

Figure 1:
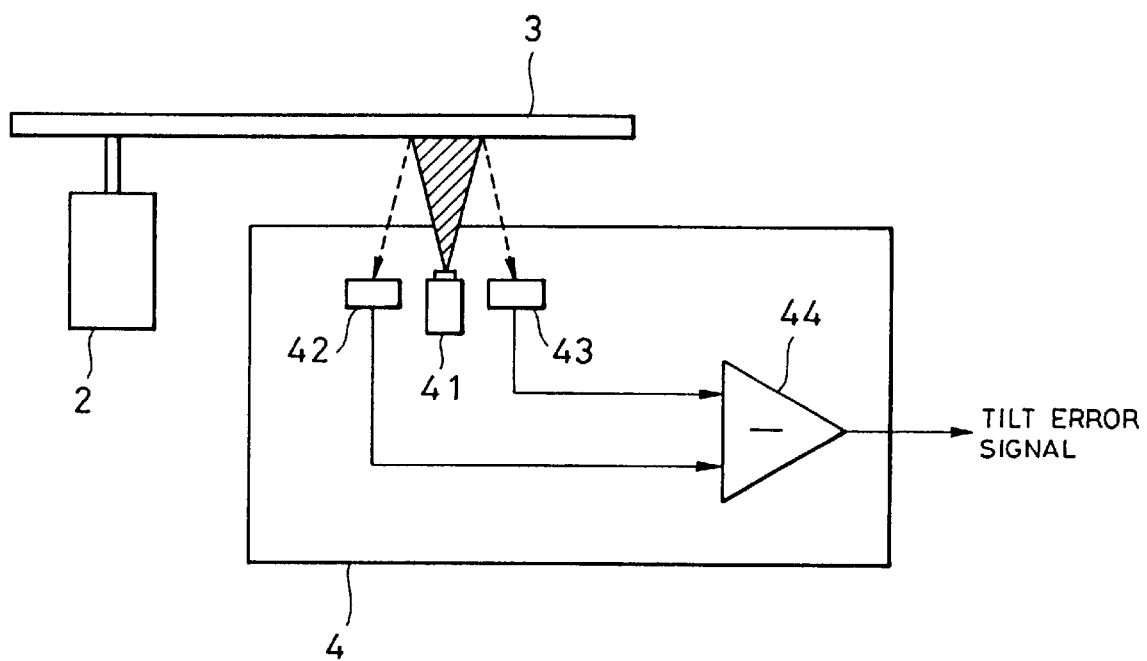
FIG. 1 is a diagram illustrating an exemplary configuration of a recorded information reproducing apparatus comprising a tilt sensor 4.
Figure 2:
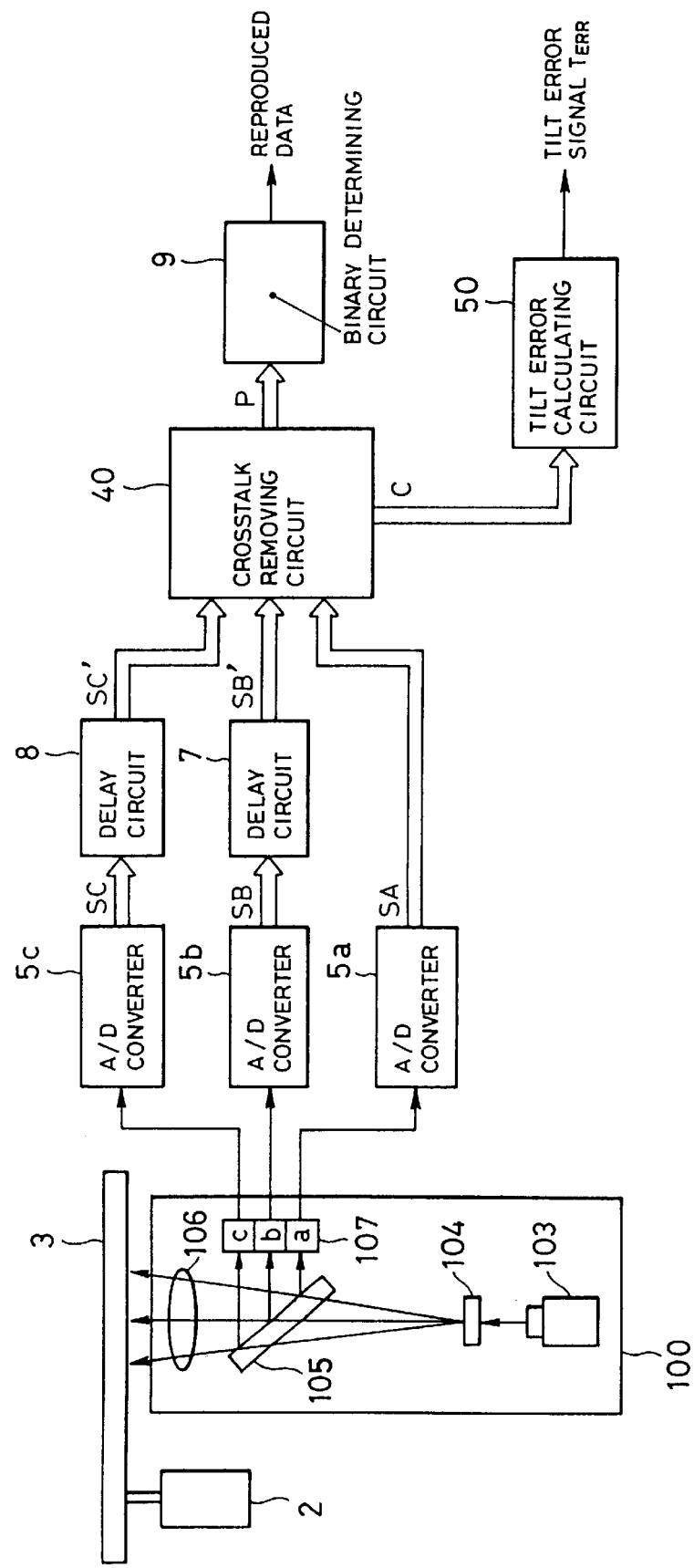
FIG. 2 is a block diagram illustrating the configuration of a recorded information reproducing apparatus comprising a tilt detector according to the present invention.

FIG. 2 illustrates the configuration of a recorded information reproducing apparatus which comprises a tilt detector according to the present invention.

Referring specifically to FIG. 2, a laser beam emitted from a laser oscillator 103 mounted in a pickup 100 as an information reading means is spit into three information reading beams by a grating 104. These three information reading beams are irradiated to a recording surface of a recording disk 3 through a half mirror 105 and an objective lens 106. Each of the three information reading beams is irradiated to a corresponding one of three recording tracks which are adjacent to each other on the recording surface of the recording disk 3.

Figure 3:
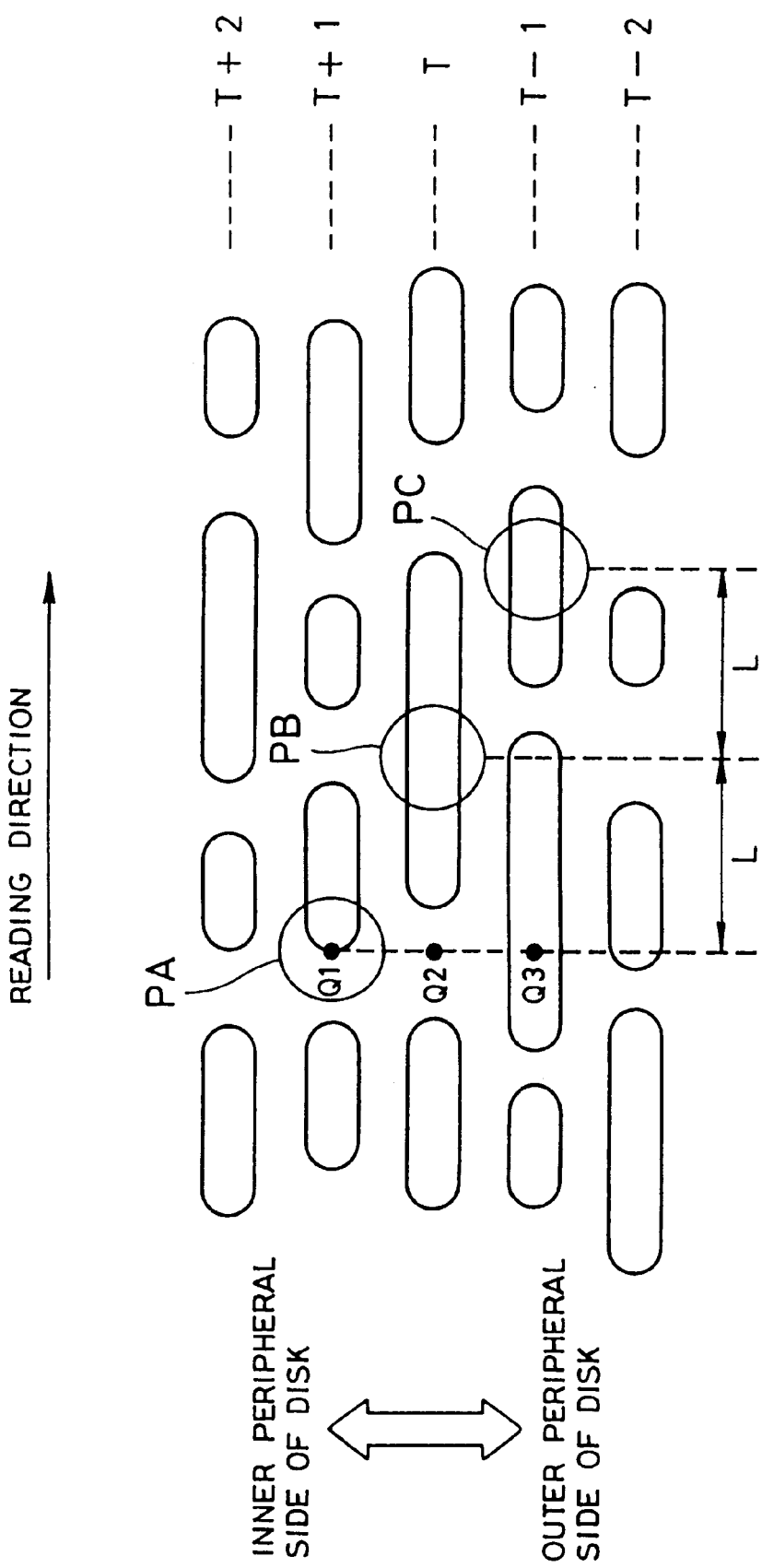
FIG. 3 is a diagram for showing a positional relationship between beam spots PA–PC and respective tracks on a recording disk 3.

FIG. 3 illustrates beam spots formed on the recording surface of the recording disk 3 by the three information reading beams.

As illustrated in FIG. 3, when a central beam spot PB is formed on a track T, a beam spot PA is formed on an adjacent track (T+1). Also, a beam spot PC is formed on the other adjacent track (T−1) of the track T.

Reflected light from each of the beam spots PA, PB, PC is irradiated to a light detecting unit 107 through an objective lens 106 and a half mirror 105. The light detecting unit 107 is composed of light detectors 107a–107c which are independent of each other.

The light detector 107a supplies an A/D converter 5a with a read signal produced by photo-electrically transducing reflected light by the beam spot PA supplied thereto through the half mirror 105. The light detector 107b supplies an A/D converter 5b with a read signal produced by photo-electrically transducing reflected light by the beam spot PB supplied thereto through the half mirror 105. The light detector 107c supplies an A/D converter 5c with a read signal produced by photo-electrically transducing reflected light by the beam spot PC supplied thereto through the half mirror 105.

As shown in FIG. 3, the beam spots PA, PB are spaced by a distance L in a reading direction, while the beam spots PB, PC are also spaced by the distance L in the reading direction.

Each of the A/D converters 5a–5c sequentially samples the read signal supplied from the corresponding one of the light detectors 107a–107c to produce a read sample value sequence SA–SC.

A delay circuit 7 delays the read sample value sequence SB by a time (L/V) to produce a delayed read sample value sequence SB' which is supplied to a crosstalk removing circuit 40. A delay circuit 8 delays the read sample value sequence SC by a time 2·(L/V) to produce a delayed read sample value sequence SC' which is supplied to the crosstalk removing circuit 40. The read sample value sequence SA output from the A/D converter 5a is directly supplied to the crosstalk removing circuit 40.

For reference, the above "L" is the distance between the beam spots PB and PC (PA) as illustrated in FIG. 3, while "V" is a line velocity of the pickup 100 at which it reads the recording disk 3.

Specifically, as illustrated in FIG. 3, when a read sample value in the read sample value sequence SA is read from a position $Q_1$ on a recording track (T+1), a read sample value in the delayed read sample value sequence SB' is read from a position $Q_2$ on a recording track T. At the time, a read sample value in the delayed read sample value sequence SC' is read from a position $Q_3$ on a recording track (T−1). These positions $Q_1$–$Q_3$ exist on the same radial line of the recording disk :3, as illustrated in FIG. 3.

The crosstalk removing circuit 40 is supplied with the three read sample value sequences (SA, SB', SC') which have been read from the respective positions existing on the same radial line of the three recording tracks adjacent to each other.

The crosstalk removing circuit 40 removes crosstalk components from each of the adjacent tracks (recording tracks (T+1), (T−1)) mixed into the delayed read sample value sequence SB' based on the read sample value sequence SA and the delayed read sample value sequence SC' to produce a non-crosstalk read sample value sequence P. A binary determining circuit 9 produces binary reproduced data based on the non-crosstalk read sample value sequence P.

Figure 4:
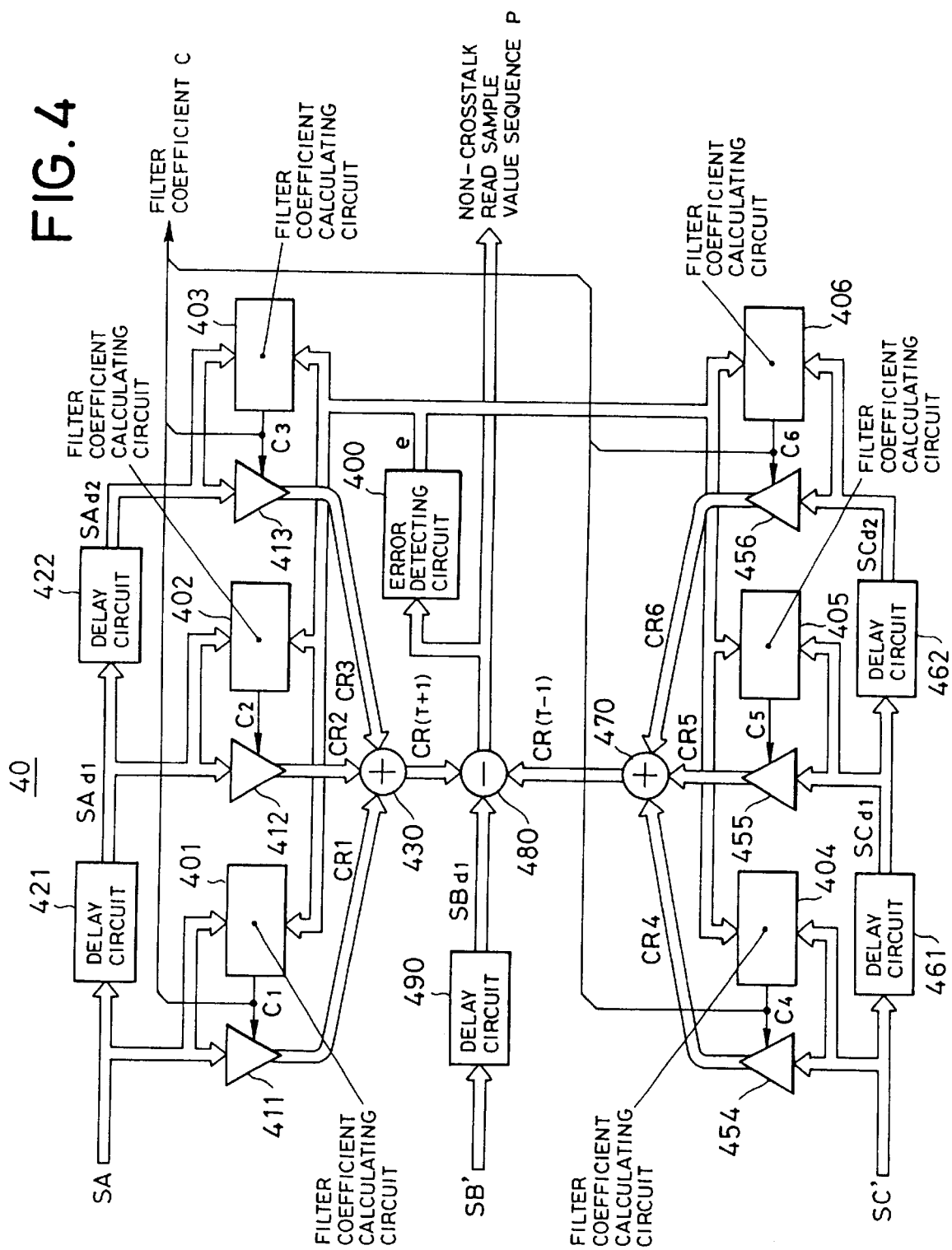
FIG. 4 is a block diagram illustrating the internal configuration of a crosstalk removing circuit 40.

FIG. 4 illustrates the internal configuration of the crosstalk removing circuit 40.

The crosstalk removing circuit 40 illustrated in FIG. 4 applies adaptive signal processing based on an adaptive algorithm such as, for example, an LMS (least mean square) algorithm to the respective read sample value sequences read from the three recording tracks (T+1), T, (T−1) adjacent to each other on the recording disk 3, respectively, to produce the read sample value sequence P from which the crosstalk has been removed.

Referring specifically to FIG. 4, a filter coefficient calculating circuit 401 calculates a filter coefficient $C_1$ based on the read sample value sequence SA and an error value e supplied thereto from an error detecting circuit 400, later described. A coefficient multiplier 411 multiplies each of read sample values in the read sample value sequence SA by the filter coefficient $C_1$ to derive a multiplication result as a crosstalk CR1 which is supplied to an adder 430. A delay circuit 421 delays the read sample value sequence SA by a predetermined time t (later described) to produce a delayed read sample value sequence $SA_{d1}$ which is supplied to a filter coefficient calculating circuit 402, a coefficient multiplier 412 and a delay circuit 422, respectively.

The filter coefficient calculating circuit 402 calculates a filter coefficient $C_2$ based on the delayed read sample value sequence $SA_{d1}$ and the error value e supplied thereto from the error detecting circuit 400. The coefficient multiplier 412 multiplies each of read sample values in the delayed read sample value sequence $SA_{d1}$ by the filter coefficient $C_2$ to derive a multiplication result as a crosstalk CR2 which is supplied to the adder 430. The delay circuit 422 delays the delayed read sample value sequence $SA_{d1}$ further by the predetermined time t to produce a delayed read sample value sequence $SA_{d2}$ which is supplied to a filter coefficient calculating circuit 403 and a coefficient multiplier 413, respectively.

The filter coefficient calculating circuit 403 calculates a filter coefficient $C_3$ based on the delayed read sample value sequence $SA_{d2}$ and the error value e supplied thereto from the error detecting circuit 400. The coefficient multiplier 413 multiplies each of read sample values in the delayed read sample value sequence $SA_{d2}$ by the filter coefficient $C_3$ to derive a multiplication result as a crosstalk CR3 which is supplied to the adder 430. The adder 430 adds the crosstalks CR1–CR3 to produce a total crosstalk $CR_{(T+1)}$ from the recording track (T+1) to the recording track T as illustrated in FIG. 3, and supplies the total crosstalk $CR_{(T+1)}$ to a subtractor 480.

The filter coefficient calculating circuit 404 calculates a filter coefficient $C_4$ based on the delayed read sample value sequence SC' and the error value e supplied thereto from the error detecting circuit 400. The coefficient multiplier 454 multiplies each of read sample values in the delayed read sample value sequence SC' by the filter coefficient C4 to derive a multiplication result as a crosstalk CR4 which is supplied to an adder 470. A delay circuit 461 delays the delayed read sample value sequence SC' by the predetermined time t to produce a delayed read sample value sequence $SC_{d1}$ which is supplied to a filter coefficient calculating circuit 405, a coefficient multiplier 455 and a delay circuit 462, respectively.

The filter coefficient calculating circuit 405 calculates a filter coefficient $C_5$ based on the delayed read sample value sequence $SC_{d1}$ and the error value e supplied thereto from the error detecting circuit 400. The coefficient multiplier 455 multiplies each of read sample values in the delayed read sample value sequence $SC_{d1}$ by the coefficient $C_5$ to produce a multiplication result as a crosstalk CR5 which is supplied to the adder 470. The delay circuit 462 delays the delayed read sample value sequence $SC_{d1}$ further by the predetermined time t to produce a delayed read sample value sequence $SC_{d2}$ which is supplied to a filter coefficient calculating circuit 406 and a coefficient multiplier 456, respectively.

The filter coefficient calculating circuit 406 calculates a filter coefficient $C_6$ based on the delayed read sample value sequence $SC_{d2}$ and the error value e supplied thereto from the error detecting circuit 400. The coefficient multiplier 456 multiplies each of read sample values in the delayed read sample value sequence $SC_{d2}$ by the filter coefficient $C_6$ to produce a multiplication result as a crosstalk CR6 which is supplied to the adder 470. The adder 470 adds the crosstalks CR4–CR6 to produce a total crosstalk $CR_{(T-1)}$ from the recording track (T−1) to the recording track T as illustrated in FIG. 3, and supplies the total crosstalk $CR_{(T-1)}$ to the subtractor 480. A delay circuit 490 delays the delayed read sample value sequence SB' further by the predetermined time t to produce a delayed read sample value sequence $SB_{d1}$ which is supplied to the subtractor 480.

The subtractor 480 subtracts each of the total crosstalk $CR_{(T+1)}$ and the total crosstalk $CR_{(T-1)}$ from the delayed read sample value sequence $SB_{d1}$ to output the differences as a non-crosstalk read sample value sequence P.

The error detecting circuit 400 detects an error between each of read sample values in the non-crosstalk read sample value sequence P and an ideal sample value for each of the read sample values, and supplies each of the filter coefficient calculating circuits 401–406 with the detected error as the error value e as mentioned above. For example, the error detecting circuit 400 extracts a central sample, i.e. a zero cross sample of three successive read sample values in the non-crosstalk read sample value sequence P when the values transition from a positive domain to a negative domain or from the negative domain to the positive domain, and takes the zero cross sample as the error value e for an actual "0" value. The filter coefficient calculating circuits 401–406 update the respective filter coefficients $C_1$–$C_6$ such that the error value e converges to "0".

Figure 5:
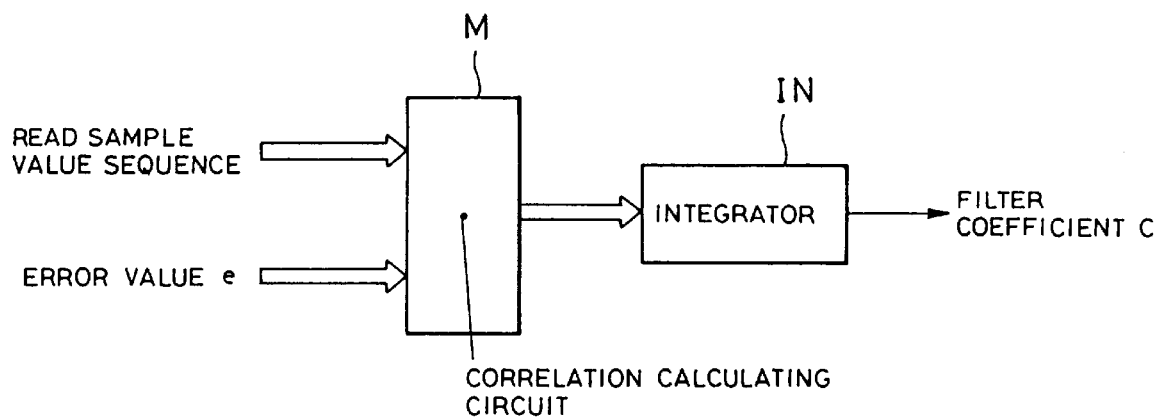
FIG. 5 is a block diagram illustrating an example of the internal configuration of filter coefficient calculating circuits 401–406.

The filter coefficient calculating circuits 401–406 have the same internal configuration which is illustrated in FIG. 5.

Referring specifically to FIG. 5, a correlation calculating circuit M calculates the correlation of the read sample value sequences (SA, $SA_{d1}$, $SA_{d2}$, SC', $SC_{d1}$, $SC_{d2}$) with the error value e, and supplies a correlated value corresponding to the correlation to an integrator IN. The correlation calculating circuit M, for example, multiplies a read sample value sequence by the error value e to derive a correlated value corresponding to the correlation of the two. The integrator IN integrates correlated values, and outputs the integration result as a filter coefficient C. For example, the filter coefficient calculating circuit 401 calculates the correlation of the read sample value sequence SA with the error value e, integrates and averages correlated values corresponding to the correlation, and outputs the resulting value as the filter coefficient $C_1$.

Figure 7A:
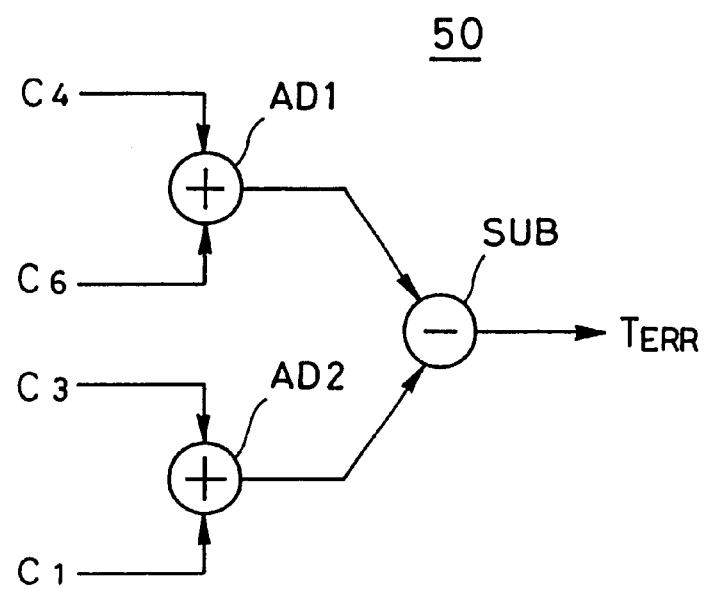
FIGS. 7A–7C are schematic diagrams each illustrating an example of the internal configuration of a tilt error calculating circuit 50.

The tilt error calculating circuit 50 in FIG. 2 is composed of adders AD1, AD2, and a subtractor SUB, as illustrated in FIG. 7A, for calculating a tilt error signal $T_{ERR}$ by executing the following calculation using the filter coefficients $C_1$, $C_3$, $C_4$, $C_6$ generated in the crosstalk removing circuit 40:

$$T_{ERR}=(C_1+C_3)-(C_4+C_6)$$

or $$T_{ERR}=(C_4+C_6)-(C_1+C_3)$$

More specifically, the tilt error signal $T_{ERR}$ corresponding to a tilt between the pickup 100 and the recording disk 3 is calculated on the basis of the relationship in magnitude between the filter coefficients ($C_1$, $C_3$) produced to remove crosstalk from a recording track (T+1) which is adjacent to a recording track T intended for reading on the inner peripheral side and the filter coefficients ($C_4$, $C_6$) produced to remove crosstalk from a recording track (T−1) which is adjacent to the recording track T on the outer peripheral side.

As described above, the tilt detector according to the present invention includes the crosstalk removing circuit 40 and the tilt error calculating circuit 50.

The operation of the crosstalk removing circuit 40 will be described with reference to FIGS. 6A–6C.

First, FIG. 6A illustrates the shape of a beam spot PB formed when an information reading beam from the pickup 100 is irradiated to a position $A_1$ on the recording track T when no tilt is present between the pickup 100 and the recording surface of the recording disk 3.

As illustrated in FIG. 6A, the beam spot PB of substantially a true circle is formed with center at the position $A_1$ on the recording track T when no tilt is present between the pickup 100 and the recording surface of the recording disk 3.

If a tilt is present between the pickup 100 and the recording surface of the recording disk 3 as illustrated in FIG. 6B, the beam spot PB has a shape elongated toward the inner periphery of the disk as illustrated in FIG. 6B. The beam spot PB is irradiated to a portion of the recording track (T+1) which is adjacent to the recording track T on the inner peripheral side of the disk, for example, to a position $A_6$ on the recording track (T+1). In addition, a side lobe PS is formed at a position on the outer peripheral side of the disk from the recording track T. Such a side lobe PS is irradiated to positions $A_2$, $A_3$ spaced by a distance $L_t$, expressed by the following equation, before and after the position $A_1$ in the reading direction on the recording track (T−1) which is adjacent to the recording track T on the outer peripheral side of the disk.

$$\{(0.65 \cdot \lambda/NA)^2-Tp^2\}^{1/2} < Lf_t < \{(\lambda/NA)^2-Tp^2\}^{1/2}$$

where $\lambda$: the wavelength of the reading beam;

NA: the numerical aperture of the objective lens 106; and

Tp: the pitch between the recording tracks.

Therefore, when a tilt as illustrated in FIG. 6B is present between the pickup 100 and the recording surface of the recording disk 3, crosstalk components from the following positions:

(1) a position $A_6$ on the recording track (T+1) which is adjacent to the recording track T on the inner peripheral side of the disk; and (2) positions $A_2$, $A_3$ on the recording track (T−1) which is adjacent to the recording track T on the outer peripheral side of the disk, are mixed in a read sample value sequence SB produced when the pickup 100 reads recorded information from the position $A_1$ on the recording track T.

On the other hand, if a tilt is present between the pickup 100 and the recording surface of the recording disk 3 as illustrated in FIG. 6C, the beam spot PB has a shape elongated toward the outer periphery of the disk as illustrated in FIG. 6C. The beam spot PB is irradiated to a portion of the recording track (T−1) which is adjacent to the recording track T on the outer peripheral side of the disk, for example, to a position $A_7$ on the recording track (T−1). In addition, a side lobe PS is formed at a position on the inner peripheral side of the disk from the recording track T. Such a side lobe PS is irradiated to positions $A_4$, $A_5$ spaced by a distance $L_t$, expressed by the following equation, before and after the position $A_1$ in the reading direction on the recording track (T+1) which is adjacent to the recording track T on the inner peripheral side of the disk.

$$\{(0.65 \cdot \lambda/NA)^2 - Tp^2\}^{1/2} < L_t < \{(\lambda NA)^2 - Tp^2\}^{1/2}$$

where $\lambda$: the wavelength of the reading beam;

NA: the numerical aperture of the objective lens 106; and

Tp: the pitch between the recording tracks.

Therefore, when a tilt as illustrated in FIG. 6C is present between the pickup 100 and the recording surface of the recording disk 3, crosstalk components from the following positions:

(1) a position $A_7$ on the recording track (T−1) which is adjacent to the recording track on the outer peripheral side of the disk; and (2) positions $A_4$, $A_5$ on the recording track (T+1) which is adjacent to the recording track on the inner peripheral side of the disk, are mixed in a read sample value sequence SB produced when the pickup 100 reads recorded information from the position $A_1$ on the recording track T.

As described above, when a tilt is present between the pickup 100 and the recording disk 3, a read signal read from the position $A_1$ on the recording track T is mixed with crosstalk components from the positions ($A_4$ and $A_5$, or $A_2$ and $A_3$) spaced by the distance $L_t$ before and after the position $A_1$ in the reading direction on the recording track (T+1) or (T−1) which is adjacent to the recording track T.

To take measures to the crosstalk components thus mixed in a read signal, the crosstalk removing circuit 40 illustrated in FIG. 4 first calculates crosstalk components from the respective positions $A_5$, $A_6$, $A_4$ on the recording track (T+1), and crosstalk components from the respective positions $A_3$, $A_7$, $A_2$ on the recording track (T−1), indicated in FIGS. 6A–6C. Then, each of the crosstalk components is subtracted from a read sample value read from the position $A_1$ on the recording track T, thereby obtaining a read sample value sequence from which the crosstalk components have been removed.

Thus, the relationship in magnitude between the crosstalk component corresponding to the adjacent recording track (T+1) and the crosstalk component corresponding to the adjacent recording track (T−1) precisely corresponds to a tilt which is present between the pickup 100 and the recording surface of the recording disk 3, as illustrated in FIGS. 6A–6C.

It is therefore possible to also sense the tilt states as illustrated in FIGS. 6A–6C, by the relationship in magnitude between the filter coefficients $C_1$, $C_3$ produced to remove the crosstalk component corresponding to the recording track (T+1) and the filter coefficients $C_4$, $C_6$ produced to remove the crosstalk component corresponding to the recording track (T−1).

While in an operation illustrated in FIG. 7A, a difference between a value derived by an addition of the filter coefficients $C_1$ and $C_3$ and a value derived by an addition of the filter coefficients $C_4$ and $C_6$ is defined as a tilt error, the tilt error may be calculated from a difference between the filter coefficients $C_1$ and $C_4$ or a difference between the filter coefficients $C_3$ and $C_6$.

Figure 7B:
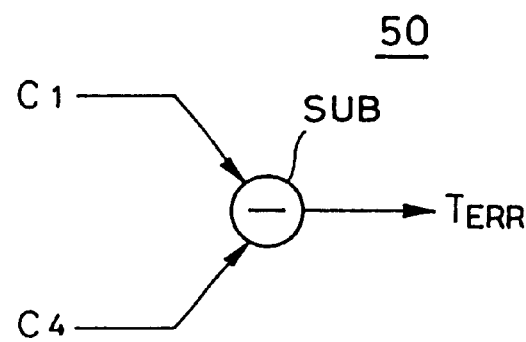

For example, with the tilt error calculating circuit 50 having an internal configuration as illustrated in FIG. 7B, a difference between the filter coefficient $C_1$ produced to remove a crosstalk component corresponding to the recording track (T+1) and the filter coefficient $C_4$ produced to remove a crosstalk component corresponding to the recording track (T−1) is calculated according to the following expression to derive the tilt error signal $T_{ERR}$:

$$T_{ERR} = C_1 - C_4$$

or $$T_{ERR} = C_4 - C_1$$

Figure 7C:
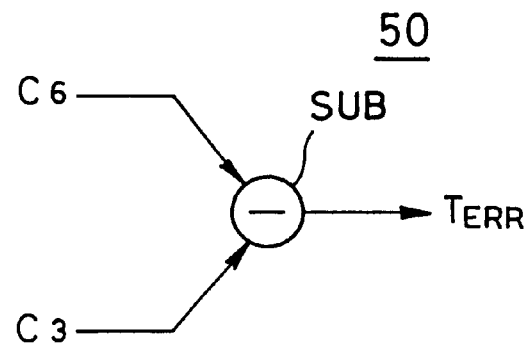

Alternatively, with the filter error calculating circuit 50 having an internal configuration as illustrated in FIG. 7C, a difference between the filter coefficient $C_3$ produced to remove a crosstalk component corresponding to the recording track (T+1) and a filter coefficient $C_6$ produced to remove a crosstalk component corresponding to the recording track (T−1) is calculated according to the following expression to derive the tilt error signal $T_{ERR}$:

$$T_{ERR} = C_3 - C_6$$

or $$T_{ERR} = C_6 - C_3$$

Further alternatively, the tilt error may be derived from a difference between the filter coefficients $C_1$ and $C_6$, or from a difference between the filter coefficients $C_3$ and $C_4$.

Figure 8A:
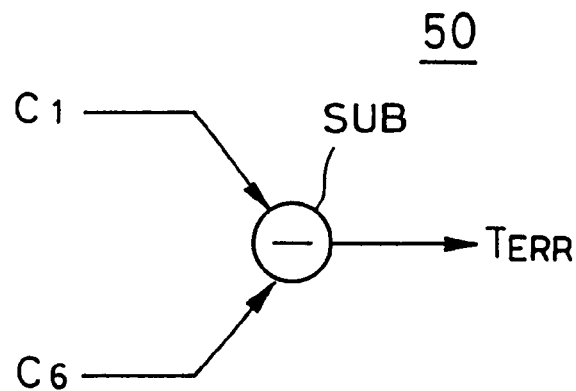
FIGS. 8A and 8B are schematic diagrams each illustrating an example of the internal configuration of the tilt error calculating circuit 50.

For example, with the tilt error calculating circuit 50 having an internal configuration as illustrated in FIG. 8A, a difference between the filter coefficient $C_1$ produced to remove a crosstalk component corresponding to the recording track (T+1) and the filter coefficient $C_6$ produced to remove a crosstalk component corresponding to the recording track (T−1) is calculated according to the following expression to derive the tilt error signal $T_{ERR}$:

$$T_{ERR} = C_1 - C_6$$

or $$T_{ERR} = C_6 - C_1$$

Figure 8B:
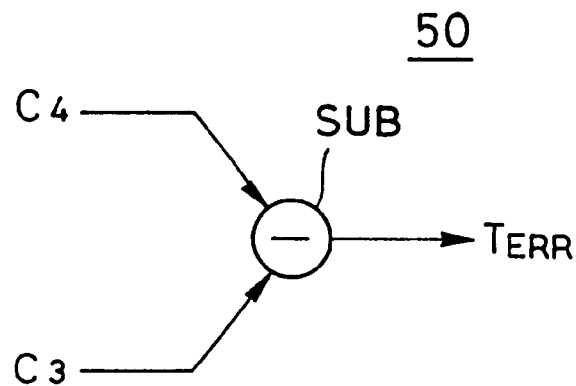

Alternatively, with the tilt error calculating circuit 50 as illustrated in FIG. 8B, a difference between the filter coefficient $C_3$ produced to remove a crosstalk component corresponding to the recording track (T+1) and the filter coefficient $C_4$ produced to remove a crosstalk component corresponding to the recording track (T−1) is calculated according to the following expression to derive the tilt error signal $T_{ERR}$:

$$T_{ERR} = C_3 - C_4$$

or $$T_{ERR}=C_4-C_3$$

That is, the tilt error calculating circuit 50 may have any configuration as long as it can derive a tilt error from the relationship in magnitude between a first filter coefficient ($C_1$, $C_3$) produced from a correlation of an error value occurring in a read signal read from a recording track intended for reading with a read signal read from a recording track adjacent to the recording track intended for reading on the inner peripheral side of the disk, and a second filter coefficient ($C_4$, $C_6$) produced from a correlation of the error value with a read signal read from a recording track adjacent to the recording track intended for reading on the outer peripheral side of the disk.

Thus, according to the configuration described above, a tilt can be accurately detected without including a tilt sensor or the like in a recorded information reproducing apparatus.

What is claimed is:

1. A tilt detector for detecting a tilt which is present between information reading means and a recording disk, said information reading means reading recorded information from said recording disk having recording tracks formed thereon, said tilt detector comprising:

error detecting means for detecting an error value between a read signal read from a central recording track within three recording tracks which are adjacent to each other and a predetermined value;

a coefficient calculating means for calculating a first coefficient from a correlation of a first read signal read from a first adjacent recording track which is adjacent to said central recording track on an inner peripheral side of the disk with said error value, and for calculating a second coefficient from a correlation of a second read signal read from a second adjacent recording track which is adjacent to said central recording track on an outer peripheral side of the disk with said error value; and means for calculating a tilt which is present between said recording disk and said information reading means based on a relationship in magnitude between said first coefficient and said second coefficient.

2. A tilt detector according to claim 1, wherein said coefficient calculating means updates said first coefficient and said second coefficient such that said error value converges to zero.

3. A tilt detector for detecting a tilt present between information reading means and a recording disk, said information reading means reading a read signal by photoelectrically transducing reflected light produced when a reading beam is irradiated to said recording disk having recording tracks formed thereon, wherein detection of a tilt is based on a position on a central recording track within three recording track adjacent to each other, at which said information reading means reads, said tilt detector comprising:

error detecting means for detecting an error value between a read signal read from said central recording track and a predetermined value;

coefficient calculating means for calculating a first coefficient from a correlation of read signals read from positions spaced by a predetermined distance before and after said reading position in a reading direction on a first adjacent recording track which is adjacent to said central recording track on an inner peripheral side of the disk with said error value, and for calculating a second coefficient from a correlation of read signals from positions spaced by a predetermined distance before and after said reading position in the reading direction on a second adjacent recording track which is adjacent to said central recording track on an outer peripheral side of the disk with said error value; and means for calculating a tilt present between said recording disk and said information reading means based on a relationship in magnitude between said first coefficient and said second coefficient.

4. A tilt detector according to claim 3, wherein said predetermined distance is expressed by:

$$\{(0.65\cdot\lambda/NA)^2-Tp^2\}^{1/2} < \text{said predetermined distance} < \{(\lambda/NA)^2-Tp^2\}^{1/2}$$

where

NA: the wavelength of said reading beam;

NA: a numerical aperture of an objective lens of said reading means; and

Tp: a pitch between recording tracks.

5. A tilt detector according to claim 3, wherein said position spaced by said predetermined distance is the position of a side lobe which is irradiated to either of said first adjacent recording track and said second adjacent recording track when a tilt is present between said recording disk and said information reading means.

* * * * *